US008771064B2

(12) United States Patent
Blanco et al.

(10) Patent No.: US 8,771,064 B2
(45) Date of Patent: Jul. 8, 2014

(54) GAMING SYSTEM AND A METHOD OF GAMING

(75) Inventors: Victor Blanco, Redmond, VA (US); Peter N. Boden, Las Vegas, NV (US)

(73) Assignee: Aristocrat Technologies Australia Pty Limited (AU)

( * ) Notice: Subject to any disclaimer, the term of this patent is extended or adjusted under 35 U.S.C. 154(b) by 280 days.

(21) Appl. No.: 13/115,476

(22) Filed: May 25, 2011

(65) Prior Publication Data

US 2011/0294576 A1 Dec. 1, 2011

Related U.S. Application Data

(60) Provisional application No. 61/348,580, filed on May 26, 2010.

(51) Int. Cl.
*A63F 13/00* (2014.01)
*G07F 17/32* (2006.01)

(52) U.S. Cl.
CPC ............ *G07F 17/32* (2013.01); *G07F 17/3211* (2013.01); *G07F 17/3223* (2013.01); *A63F 2300/538* (2013.01)
USPC ................................. 463/30; 463/31; 463/20

(58) Field of Classification Search
CPC . G07F 17/32; G07F 17/3211; G07F 17/3223; A63F 2300/538
USPC ......................................... 463/16-20, 30, 31
See application file for complete search history.

(56) References Cited

U.S. PATENT DOCUMENTS

| | | | |
|---|---|---|---|
| 5,781,740 | A | 7/1998 | Tanaka |
| 5,991,443 | A | 11/1999 | Gallery et al. |
| 6,067,098 | A | 5/2000 | Dye |
| 6,404,430 | B1 | 6/2002 | Kawamura et al. |
| 6,518,965 | B2 | 2/2003 | Dye et al. |
| 6,567,091 | B2 | 5/2003 | Dye et al. |
| 6,956,573 | B1 | 10/2005 | Bergen et al. |
| 6,993,494 | B1 | 1/2006 | Boushy et al. |
| 7,012,606 | B2 | 3/2006 | Swedberg et al. |
| 7,022,905 | B1 | 4/2006 | Hinman et al. |
| 7,155,590 | B2 | 12/2006 | Mathis |
| 7,212,978 | B2 | 5/2007 | Kowal et al. |
| 7,279,629 | B2 | 10/2007 | Hinman et al. |
| 7,316,609 | B2 | 1/2008 | Dunn et al. |
| 7,424,175 | B2 | 9/2008 | Lipton et al. |
| 7,467,289 | B1 | 12/2008 | Garlick et al. |
| 7,477,653 | B2 | 1/2009 | Smith et al. |

(Continued)

FOREIGN PATENT DOCUMENTS

| | | | |
|---|---|---|---|
| AU | 2001247941 | B2 | 10/2001 |
| AU | 2002231093 | A1 | 6/2003 |

(Continued)

*Primary Examiner* — Michael Cuff
(74) *Attorney, Agent, or Firm* — McAndrews, Held & Malloy, Ltd.

(57) ABSTRACT

A method includes providing a gaming machine with an electronic display for displaying graphical output and providing said gaming machine with a programmable compositing client. The method also includes managing renderable graphics assets for use in said graphical output with a graphics engine, providing the renderable graphics assets on demand to the compositing client with said graphics engine, rendering the graphical output including one or more of the renderable graphics assets with the compositing client, and controlling one or more visual aspects of the graphical output with the graphics engine.

29 Claims, 6 Drawing Sheets

(56) References Cited

U.S. PATENT DOCUMENTS

| | | | | |
|---|---|---|---|---|
| 7,512,940 | B2 | 3/2009 | Horvitz | |
| 7,537,216 | B2 | 5/2009 | Soltys et al. | |
| 7,558,472 | B2 | 7/2009 | Locket et al. | |
| 7,584,497 | B2 | 9/2009 | Potrebic et al. | |
| 7,630,986 | B1 | 12/2009 | Herz et al. | |
| 2001/0056574 | A1 | 12/2001 | Richards | |
| 2002/0037160 | A1 | 3/2002 | Locket et al. | |
| 2002/0091991 | A1 | 7/2002 | Castro | |
| 2002/0135585 | A1 | 9/2002 | Dye et al. | |
| 2002/0145611 | A1 | 10/2002 | Dye et al. | |
| 2002/0147047 | A1 | 10/2002 | Letovsky et al. | |
| 2002/0158865 | A1 | 10/2002 | Dye et al. | |
| 2003/0154282 | A1 | 8/2003 | Horvitz | |
| 2003/0216961 | A1 | 11/2003 | Barry | |
| 2003/0216966 | A1 | 11/2003 | Saenz et al. | |
| 2004/0024608 | A1 | 2/2004 | Saenz et al. | |
| 2004/0143496 | A1 | 7/2004 | Saenz | |
| 2004/0158536 | A1 | 8/2004 | Kowal et al. | |
| 2004/0169650 | A1* | 9/2004 | Bastos et al. | 345/426 |
| 2004/0172638 | A1 | 9/2004 | Larus et al. | |
| 2005/0020354 | A1 | 1/2005 | Nguyen et al. | |
| 2005/0027721 | A1 | 2/2005 | Saenz | |
| 2005/0059459 | A1 | 3/2005 | Dunn et al. | |
| 2005/0088436 | A1 | 4/2005 | Swedberg et al. | |
| 2005/0102321 | A1 | 5/2005 | David et al. | |
| 2005/0120868 | A1 | 6/2005 | Hinman et al. | |
| 2005/0128286 | A1 | 6/2005 | Richards | |
| 2005/0182647 | A1 | 8/2005 | Saenz et al. | |
| 2005/0215325 | A1 | 9/2005 | Nguyen et al. | |
| 2005/0239545 | A1 | 10/2005 | Rowe | |
| 2005/0277474 | A1 | 12/2005 | Barry | |
| 2006/0046819 | A1 | 3/2006 | Nguyen et al. | |
| 2006/0073884 | A1 | 4/2006 | Walker et al. | |
| 2006/0082643 | A1 | 4/2006 | Richards | |
| 2006/0126667 | A1 | 6/2006 | Smith et al. | |
| 2006/0148549 | A1 | 7/2006 | Walker et al. | |
| 2006/0189379 | A1 | 8/2006 | Pacey | |
| 2006/0189391 | A1 | 8/2006 | Bird | |
| 2006/0200842 | A1 | 9/2006 | Chapman et al. | |
| 2006/0205513 | A1 | 9/2006 | Breckner et al. | |
| 2006/0205514 | A1 | 9/2006 | Cockerille et al. | |
| 2006/0205515 | A1 | 9/2006 | Cockerille et al. | |
| 2006/0211470 | A1 | 9/2006 | Walker et al. | |
| 2006/0247064 | A1 | 11/2006 | Nguyen et al. | |
| 2006/0252530 | A1 | 11/2006 | Oberberger et al. | |
| 2006/0252533 | A1 | 11/2006 | Sakaguchi et al. | |
| 2006/0268099 | A1 | 11/2006 | Potrebic et al. | |
| 2006/0288998 | A1 | 12/2006 | Abbott | |
| 2006/0291506 | A1 | 12/2006 | Cain | |
| 2007/0004510 | A1 | 1/2007 | Underdahl et al. | |
| 2007/0060302 | A1 | 3/2007 | Fabbri | |
| 2007/0077978 | A1 | 4/2007 | Walker et al. | |
| 2007/0117637 | A1 | 5/2007 | Morgan et al. | |
| 2007/0160289 | A1 | 7/2007 | Lipton et al. | |
| 2007/0171921 | A1 | 7/2007 | Wookey et al. | |
| 2007/0173310 | A1 | 7/2007 | Walker et al. | |
| 2007/0174410 | A1 | 7/2007 | Croft et al. | |
| 2007/0174429 | A1 | 7/2007 | Mazzaferri et al. | |
| 2007/0178972 | A1 | 8/2007 | Moshal | |
| 2007/0179955 | A1 | 8/2007 | Croft et al. | |
| 2007/0180447 | A1 | 8/2007 | Mazzaferri et al. | |
| 2007/0180448 | A1 | 8/2007 | Low et al. | |
| 2007/0180449 | A1 | 8/2007 | Croft et al. | |
| 2007/0180450 | A1 | 8/2007 | Croft et al. | |
| 2007/0180493 | A1 | 8/2007 | Croft et al. | |
| 2007/0186212 | A1 | 8/2007 | Mazzaferri et al. | |
| 2007/0191109 | A1 | 8/2007 | Crowder et al. | |
| 2007/0192329 | A1 | 8/2007 | Croft et al. | |
| 2007/0198656 | A1 | 8/2007 | Mazzaferri et al. | |
| 2007/0250872 | A1 | 10/2007 | Dua | |
| 2007/0265094 | A1 | 11/2007 | Tone et al. | |
| 2007/0270211 | A1 | 11/2007 | Moshal | |
| 2007/0277234 | A1 | 11/2007 | Bessonov et al. | |
| 2008/0005586 | A1 | 1/2008 | Munguia | |
| 2008/0009335 | A1 | 1/2008 | Walker et al. | |
| 2008/0009340 | A1 | 1/2008 | Walker et al. | |
| 2008/0009341 | A1 | 1/2008 | Walker et al. | |
| 2008/0015010 | A1 | 1/2008 | Bird | |
| 2008/0015016 | A1 | 1/2008 | Bird | |
| 2008/0015019 | A1 | 1/2008 | Bird | |
| 2008/0015026 | A1 | 1/2008 | Bird | |
| 2008/0015027 | A1 | 1/2008 | Bird | |
| 2008/0015028 | A1 | 1/2008 | Bird | |
| 2008/0015029 | A1 | 1/2008 | Bird | |
| 2008/0020729 | A1 | 1/2008 | Bernal et al. | |
| 2008/0020827 | A1 | 1/2008 | Underdahl et al. | |
| 2008/0026849 | A1 | 1/2008 | Bird | |
| 2008/0026850 | A1 | 1/2008 | Bird | |
| 2008/0026854 | A1 | 1/2008 | Chen et al. | |
| 2008/0032802 | A1 | 2/2008 | Bird | |
| 2008/0039189 | A1 | 2/2008 | Walker et al. | |
| 2008/0045288 | A1 | 2/2008 | Moshal et al. | |
| 2008/0045345 | A1 | 2/2008 | Bird | |
| 2008/0046587 | A1 | 2/2008 | Sakoh et al. | |
| 2008/0096628 | A1 | 4/2008 | Czyzewski et al. | |
| 2008/0113782 | A2 | 5/2008 | Moshal | |
| 2008/0113802 | A1 | 5/2008 | Johnson et al. | |
| 2008/0132313 | A1 | 6/2008 | Rasmussen et al. | |
| 2008/0153599 | A1 | 6/2008 | Atashband et al. | |
| 2008/0153600 | A1 | 6/2008 | Swarna | |
| 2008/0154916 | A1 | 6/2008 | Atashband | |
| 2008/0155665 | A1 | 6/2008 | Ruppert et al. | |
| 2008/0162729 | A1 | 7/2008 | Ruppert | |
| 2008/0167118 | A1 | 7/2008 | Kroeckel et al. | |
| 2008/0167130 | A1 | 7/2008 | Kroeckel et al. | |
| 2008/0171588 | A1 | 7/2008 | Atashband | |
| 2008/0171598 | A1 | 7/2008 | Deng | |
| 2008/0176637 | A1 | 7/2008 | Letovsky et al. | |
| 2008/0182644 | A1 | 7/2008 | Lutnick et al. | |
| 2008/0216064 | A1 | 9/2008 | Braswell | |
| 2008/0244150 | A1 | 10/2008 | Sharma | |
| 2008/0287197 | A1 | 11/2008 | Ruppert et al. | |
| 2008/0288639 | A1 | 11/2008 | Ruppert et al. | |
| 2008/0303811 | A1 | 12/2008 | Van Luchene | |
| 2008/0318686 | A1 | 12/2008 | Crowder et al. | |
| 2009/0029766 | A1 | 1/2009 | Lutnick et al. | |
| 2009/0029775 | A1 | 1/2009 | Ruppert et al. | |
| 2009/0029776 | A1 | 1/2009 | Ruppert et al. | |
| 2009/0048010 | A1 | 2/2009 | Kroeckel et al. | |
| 2009/0054141 | A1 | 2/2009 | Williams et al. | |
| 2009/0055157 | A1 | 2/2009 | Soffer | |
| 2009/0061983 | A1* | 3/2009 | Kaufman | 463/20 |
| 2009/0077255 | A1 | 3/2009 | Smith et al. | |
| 2009/0093300 | A1 | 4/2009 | Lutnick et al. | |
| 2009/0098921 | A1 | 4/2009 | Manning et al. | |
| 2009/0104960 | A1 | 4/2009 | Kelly et al. | |
| 2009/0104963 | A1 | 4/2009 | Burman et al. | |
| 2009/0104987 | A1 | 4/2009 | Kelly et al. | |
| 2009/0115133 | A1 | 5/2009 | Kelly et al. | |
| 2009/0117994 | A1 | 5/2009 | Kelly et al. | |
| 2009/0118001 | A1 | 5/2009 | Kelly et al. | |
| 2009/0118005 | A1 | 5/2009 | Kelly et al. | |
| 2009/0118006 | A1 | 5/2009 | Kelly et al. | |
| 2009/0118017 | A1 | 5/2009 | Perlman et al. | |
| 2009/0118018 | A1 | 5/2009 | Perlman et al. | |
| 2009/0118019 | A1 | 5/2009 | Perlman et al. | |
| 2009/0119729 | A1 | 5/2009 | Periman et al. | |
| 2009/0119730 | A1 | 5/2009 | Perlman et al. | |
| 2009/0119731 | A1 | 5/2009 | Perlman et al. | |
| 2009/0119736 | A1 | 5/2009 | Perlman et al. | |
| 2009/0119737 | A1 | 5/2009 | Perlman et al. | |
| 2009/0119738 | A1 | 5/2009 | Perlman et al. | |
| 2009/0124350 | A1* | 5/2009 | Iddings et al. | 463/25 |
| 2009/0124374 | A1 | 5/2009 | Patel | |
| 2009/0124375 | A1 | 5/2009 | Patel | |
| 2009/0124387 | A1 | 5/2009 | Perlman et al. | |
| 2009/0124392 | A1 | 5/2009 | Ruppert et al. | |
| 2009/0124394 | A1 | 5/2009 | Swarna | |
| 2009/0125603 | A1 | 5/2009 | Atashband et al. | |
| 2009/0125961 | A1 | 5/2009 | Perlman et al. | |
| 2009/0125967 | A1 | 5/2009 | Perlman et al. | |
| 2009/0125968 | A1 | 5/2009 | Perlman et al. | |
| 2009/0131125 | A1 | 5/2009 | Hirai | |
| 2009/0131144 | A1 | 5/2009 | Allen | |

(56) References Cited

U.S. PATENT DOCUMENTS

| | | | | |
|---|---|---|---|---|
| 2009/0131163 | A1 | 5/2009 | Arbogast et al. | |
| 2009/0131168 | A1 | 5/2009 | Waxman et al. | |
| 2009/0132720 | A1 | 5/2009 | Ruppert et al. | |
| 2009/0140492 | A1 | 6/2009 | Yoseloff et al. | |
| 2009/0149245 | A1 | 6/2009 | Fabbri | |
| 2009/0163279 | A1 | 6/2009 | Hermansen et al. | |
| 2009/0167763 | A1 | 7/2009 | Waechter et al. | |
| 2009/0174711 | A1 | 7/2009 | Lee et al. | |
| 2009/0179378 | A1 | 7/2009 | Amaitis et al. | |
| 2009/0181776 | A1 | 7/2009 | Deng | |
| 2009/0183243 | A1 | 7/2009 | Ruppert et al. | |
| 2009/0186676 | A1 | 7/2009 | Amaitis et al. | |
| 2009/0191933 | A1 | 7/2009 | French | |
| 2009/0196516 | A1 | 8/2009 | Perlman et al. | |
| 2009/0203430 | A1 | 8/2009 | Peek | |
| 2009/0208189 | A1 | 8/2009 | Sasaki et al. | |
| 2009/0213927 | A1 | 8/2009 | Perlman et al. | |
| 2009/0213935 | A1 | 8/2009 | van der Laan et al. | |
| 2009/0215531 | A1 | 8/2009 | Perlman et al. | |
| 2009/0215540 | A1 | 8/2009 | Perlman et al. | |
| 2009/0220001 | A1 | 9/2009 | van der Laan et al. | |
| 2009/0220002 | A1 | 9/2009 | Laan et al. | |
| 2009/0224476 | A1 | 9/2009 | Grauzer et al. | |
| 2009/0225220 | A1 | 9/2009 | van der Laan et al. | |
| 2009/0225828 | A1 | 9/2009 | Perlman et al. | |
| 2009/0225863 | A1 | 9/2009 | Perlman et al. | |
| 2009/0228520 | A1 | 9/2009 | Yahata et al. | |
| 2009/0228946 | A1 | 9/2009 | Perlman et al. | |
| 2009/0233705 | A1 | 9/2009 | LeMay et al. | |
| 2009/0239636 | A1* | 9/2009 | Lankots | 463/20 |
| 2009/0239650 | A1 | 9/2009 | Alderucci et al. | |
| 2009/0253516 | A1 | 10/2009 | Hartmann et al. | |
| 2009/0254971 | A1 | 10/2009 | Herz et al. | |
| 2009/0265528 | A1 | 10/2009 | Du et al. | |
| 2009/0269024 | A1 | 10/2009 | Locket et al. | |
| 2009/0269031 | A1 | 10/2009 | Locket et al. | |
| 2009/0273604 | A1 | 11/2009 | Kim | |
| 2009/0275393 | A1 | 11/2009 | Kisenwether et al. | |
| 2009/0275398 | A1* | 11/2009 | Nelson | 463/27 |
| 2009/0275414 | A1 | 11/2009 | Lee et al. | |
| 2009/0284620 | A1 | 11/2009 | Labians | |
| 2009/0286588 | A1* | 11/2009 | Jackson | 463/20 |
| 2009/0291736 | A1 | 11/2009 | Walker et al. | |
| 2009/0297023 | A1 | 12/2009 | Lipton et al. | |
| 2009/0305765 | A1 | 12/2009 | Walker et al. | |
| 2009/0318220 | A1 | 12/2009 | Arezina et al. | |
| 2009/0324202 | A1 | 12/2009 | Okubo et al. | |
| 2009/0325682 | A1 | 12/2009 | Barney et al. | |
| 2010/0009737 | A1 | 1/2010 | Lutnick et al. | |
| 2010/0009741 | A1 | 1/2010 | Alderucci et al. | |
| 2010/0009750 | A1 | 1/2010 | Egozy et al. | |
| 2010/0016067 | A1 | 1/2010 | White et al. | |
| 2010/0016068 | A1 | 1/2010 | White et al. | |
| 2010/0021145 | A1 | 1/2010 | Oashi et al. | |
| 2011/0081959 | A1* | 4/2011 | Ansari et al. | 463/16 |
| 2011/0117994 | A1* | 5/2011 | Harvey et al. | 463/20 |

FOREIGN PATENT DOCUMENTS

| | | | |
|---|---|---|---|
| AU | 2003224834 | A1 | 10/2003 |
| AU | 2005215936 | A1 | 2/2004 |
| AU | 2004275065 | A1 | 3/2005 |
| AU | 2004279201 | A8 | 5/2005 |
| AU | 2004287140 | A1 | 5/2005 |
| AU | 2004279201 | A1 | 6/2005 |
| AU | 2004279201 | B2 | 6/2005 |
| AU | 2005201254 | A1 | 10/2005 |
| AU | 2005203007 | A1 | 2/2006 |
| AU | 2006223527 | A1 | 9/2006 |
| AU | 2006223528 | A1 | 9/2006 |
| AU | 2006244605 | A1 | 11/2006 |
| AU | 2006280249 | A1 | 2/2007 |
| AU | 2006335151 | A1 | 7/2007 |
| AU | 2007208093 | A1 | 8/2007 |
| AU | 2007202078 | A1 | 11/2007 |
| AU | 2007260965 | A1 | 12/2007 |
| AU | 2007273116 | A1 | 1/2008 |
| AU | 2007275043 | A1 | 1/2008 |
| AU | 2007286884 | A1 | 2/2008 |
| AU | 2007209807 | A1 | 3/2008 |
| AU | 2007290489 | A1 | 3/2008 |
| AU | 2008236580 | A1 | 10/2008 |
| AU | 2009201701 | A1 | 5/2009 |
| AU | 2009201702 | A1 | 5/2009 |
| AU | 2008249574 | A1 | 8/2009 |
| AU | 2010227013 | A1 | 10/2010 |
| EP | 0725341 | A2 | 8/1996 |
| WO | 9821688 | A1 | 5/1998 |
| WO | 9952093 | A1 | 10/1999 |
| WO | 9956249 | A1 | 11/1999 |
| WO | 02055163 | A3 | 7/2002 |
| WO | 03001803 | A1 | 1/2003 |
| WO | 03019932 | A1 | 3/2003 |
| WO | 03085579 | A1 | 10/2003 |
| WO | 2004072768 | A2 | 8/2004 |
| WO | 2005029212 | A2 | 3/2005 |
| WO | 2005029417 | A2 | 3/2005 |
| WO | 2005045580 | A2 | 5/2005 |
| WO | 2005046102 | A2 | 5/2005 |
| WO | 2005081623 | A2 | 9/2005 |
| WO | 2006026203 | A1 | 3/2006 |
| WO | 2006098931 | A1 | 9/2006 |
| WO | 2006098932 | A1 | 9/2006 |
| WO | 2006121498 | A2 | 11/2006 |
| WO | 2006127211 | A2 | 11/2006 |
| WO | 2007021506 | A1 | 2/2007 |
| WO | 2007024289 | A2 | 3/2007 |
| WO | 2007067980 | A2 | 6/2007 |
| WO | 2007081519 | A2 | 7/2007 |
| WO | 2007087558 | A2 | 8/2007 |
| WO | 2007100942 | A2 | 9/2007 |
| WO | 2007126525 | A2 | 11/2007 |
| WO | 2007149947 | A2 | 12/2007 |
| WO | 2008005236 | A2 | 1/2008 |
| WO | 2008008250 | A2 | 1/2008 |
| WO | 2008008623 | A2 | 1/2008 |
| WO | 2008011605 | A2 | 1/2008 |
| WO | 2008013541 | A2 | 1/2008 |
| WO | 2008024705 | A2 | 2/2008 |
| WO | 2008027444 | A2 | 3/2008 |
| WO | 2008030781 | A2 | 3/2008 |
| WO | 2008030881 | A2 | 3/2008 |
| WO | 2008039402 | A2 | 4/2008 |
| WO | 2008039848 | A2 | 4/2008 |
| WO | 2008045464 | A2 | 4/2008 |
| WO | 2008057189 | A2 | 5/2008 |
| WO | 2008095201 | A1 | 8/2008 |
| WO | 2008097470 | A2 | 8/2008 |
| WO | 2008104786 | A2 | 9/2008 |
| WO | 2008104795 | A1 | 9/2008 |
| WO | 2008124179 | A1 | 10/2008 |
| WO | 2008143845 | A1 | 11/2008 |
| WO | 2009007701 | A1 | 1/2009 |
| WO | 2009014738 | A1 | 1/2009 |
| WO | 2009015347 | A1 | 1/2009 |
| WO | 2009032598 | A1 | 3/2009 |
| WO | 2009044095 | A1 | 4/2009 |
| WO | 2009044282 | A2 | 4/2009 |
| WO | 2009045288 | A1 | 4/2009 |
| WO | 2009049124 | A1 | 4/2009 |
| WO | 2009049176 | A1 | 4/2009 |
| WO | 2009056787 | A1 | 5/2009 |
| WO | 2009062187 | A1 | 5/2009 |
| WO | 2009073792 | A1 | 6/2009 |
| WO | 2009073793 | A1 | 6/2009 |
| WO | 2009073795 | A1 | 6/2009 |
| WO | 2009073796 | A1 | 6/2009 |
| WO | 2009073797 | A1 | 6/2009 |
| WO | 2009073798 | A1 | 6/2009 |
| WO | 2009073799 | A1 | 6/2009 |
| WO | 2009073800 | A1 | 6/2009 |
| WO | 2009073801 | A1 | 6/2009 |
| WO | 2009073802 | A1 | 6/2009 |

(56) References Cited

FOREIGN PATENT DOCUMENTS

| | | | |
|---|---|---|---|
| WO | 2009073819 | A1 | 6/2009 |
| WO | 2009073823 | A1 | 6/2009 |
| WO | 2009073824 | A1 | 6/2009 |
| WO | 2009073825 | A1 | 6/2009 |
| WO | 2009073826 | A1 | 6/2009 |
| WO | 2009073827 | A1 | 6/2009 |
| WO | 2009073828 | A1 | 6/2009 |
| WO | 2009073830 | A1 | 6/2009 |
| WO | 2009073831 | A1 | 6/2009 |
| WO | 2009073832 | A1 | 6/2009 |
| WO | 2009073833 | A1 | 6/2009 |
| WO | 2009076172 | A2 | 6/2009 |
| WO | 2009076177 | A1 | 6/2009 |
| WO | 2009076178 | A1 | 6/2009 |
| WO | 2009091444 | A1 | 7/2009 |
| WO | 2009108471 | A2 | 9/2009 |
| WO | 2009132013 | A1 | 10/2009 |
| WO | 2009134912 | A2 | 11/2009 |
| WO | 2009142915 | A1 | 11/2009 |
| WO | 2009151919 | A2 | 12/2009 |
| WO | 2009154480 | A1 | 12/2009 |
| WO | 2009154482 | A1 | 12/2009 |
| WO | 2009154484 | A2 | 12/2009 |
| WO | 2010002882 | A2 | 1/2010 |
| WO | 2010006054 | A1 | 1/2010 |
| WO | 2010006277 | A1 | 1/2010 |

* cited by examiner

GAMING SYSTEM AND A METHOD OF GAMING

RELATED APPLICATIONS

This application claims priority to U.S. Provisional Application No. 61/348,580, having a filing date of May 26, 2010, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a gaming system, a method of gaming, a game controller and computer program code.

It is known to provide a gaming system which comprises a game controller arranged to randomly display several symbols from a predetermined set of symbols and to determine a game outcome such as a game win based on the displayed symbols.

Such gaming systems may commonly be implemented as a stepper machine provided with reels with each reel carrying several symbols of the set, or a video machine wherein selected symbols are displayed on virtual reels on a video display. In both of these examples, such gaming machines may include a smaller, secondary video displays for outputting ancillary information to a player.

While such gaming systems provide players with enjoyment, a need exists for alternative gaming systems in order to maintain or increase machine performance and hence player enjoyment.

BRIEF SUMMARY OF THE INVENTION

In a first aspect, the invention provides a method of gaming comprising:

providing a gaming machine with an electronic display for displaying graphical output;

providing the gaming machine with a programmable compositing client;

managing renderable graphics assets for use in the graphical output with a graphics engine;

providing the renderable graphics assets on demand to the compositing client with the graphics engine;

rendering the graphical output including one or more of the renderable graphics assets with the compositing client; and controlling one or more visual aspects (such as positioning, rotation, scaling, fading or layout) of the graphical output with the graphics engine.

The method may include providing the graphics engine in the gaming machine.

In one embodiment, method includes providing the graphics engine in a game controller of the gaming machine.

In a certain embodiment, method includes providing the graphics engine in a game server remote from the gaming machine.

In a particular embodiment, the compositing client comprises a field-programmable gate array (FPGA).

In other embodiments, the compositing client may comprise, for example, a processor, a personal computer, a set top box, or a mobile telecommunications device such as a telephone or PDA.

In some embodiments, the compositing client may not be programmable after installation.

According to a second aspect, there is provided a method of providing graphical output, comprising:

providing an electronic device with an electronic display for displaying graphical output;

providing the electronic device with a programmable compositing client;

managing renderable graphics assets for use in the graphical output with a graphics engine;

providing the renderable graphics on demand to the compositing client with the graphics engine;

rendering the graphical output including one or more of the renderable graphics assets with the compositing client; and controlling one or more visual aspects (such as positioning, rotation, scaling, fading or layout) of the graphical output with the graphics engine.

It will be appreciated that the approach of the present invention may be employed in other electronic devices with video displays.

According to a third aspect, there is provided a method of providing graphical output comprising:

managing, with a graphics engine, renderable graphics assets for use in a graphical output to be displayed on an electronic display of a gaming machine;

providing, with said graphics engine, said renderable graphics assets on demand to a compositing client of said gaming machine;

rendering said graphical output including one or more of said renderable graphics assets with said compositing client; and controlling one or more visual aspects of the graphical output with the graphics engine.

In one embodiment, controlling one or more visual aspects of the graphical output comprises controlling one or more of positioning, rotation, scaling, fading and layout of said graphical output with said graphics engine.

In an embodiment, said compositing client comprises a field-programmable gate array (FPGA)

According to a fourth aspect, there is provided a game controller for a gaming system, the game controller arranged to:

manage renderable graphics assets for use in graphical output with a graphics engine;

provide the renderable graphics assets on demand to a programmable compositing client provided in a gaming system with the graphics engine, for use by the compositing client in rendering the graphical output; and control one or more visual aspects (such as positioning, rotation, scaling, fading or layout) of the graphical output with the graphics engine.

The game controller may be provided in a gaming machine of the gaming system.

In one embodiment, the graphics engine is provided in the game controller.

In a certain embodiment, the graphics engine is provided in a game server of the gaming system remote from the gaming machine.

In a particular embodiment, the compositing client comprises a field-programmable gate array (FPGA).

According to a fifth aspect, there is provided a controller for an electronic device, the controller arranged to:

manage renderable graphics assets for use in graphical output with a graphics engine;

provide the renderable graphics assets on demand to a programmable compositing client provided in an electronic device with the graphics engine, for use by the compositing client in rendering the graphical output; and control one or more visual aspects (such as positioning, rotation, scaling, fading or layout) of the graphical output with the graphics engine.

According to a sixth aspect, there is provided a gaming system comprising:

a player interface comprising a display for displaying game outcomes to a player; and a game controller arranged to:

manage renderable graphics assets for use in graphical output with a graphics engine;

provide the renderable graphics assets on demand to a programmable compositing client provided in a gaming system with the graphics engine, for use by the compositing client in rendering the graphical output; and control one or more visual aspects (such as positioning, rotation, scaling, fading or layout) of the graphical output with the graphics engine.

According to a seventh aspect, there is provided a gaming system comprising:

an electronic display for displaying graphical output;

a programmable compositing client; and a graphics engine arranged to manage renderable graphics assets for use in said graphical output and to provide said renderable graphics assets on demand to said compositing client with said graphics engine, said compositing client rendering said graphical output including one or more of said renderable graphics assets with said compositing client, and said graphics engine controlling one or more visual aspects of the graphical output.

In an embodiment, said graphics engine controls one or more of positioning, rotation, scaling, fading and layout of said graphical output with said graphics engine.

In an embodiment, said compositing client comprises a field-programmable gate array.

In an embodiment, the gaming system is in the form of a gaming machine.

In an eighth aspect, the invention provides computer program code which when executed implements the above method.

In ninth aspect, the invention provides a tangible computer readable medium comprising the above program code.

It should be noted that the various features of each of the above aspects of the invention, and the embodiments described below, can be combined as feasible and desired.

BRIEF DESCRIPTION OF SEVERAL VIEWS OF THE DRAWINGS

Exemplary embodiments of the invention will now be described with reference to the accompanying drawings in which.

DETAILED DESCRIPTION OF THE INVENTION

Figure 1:
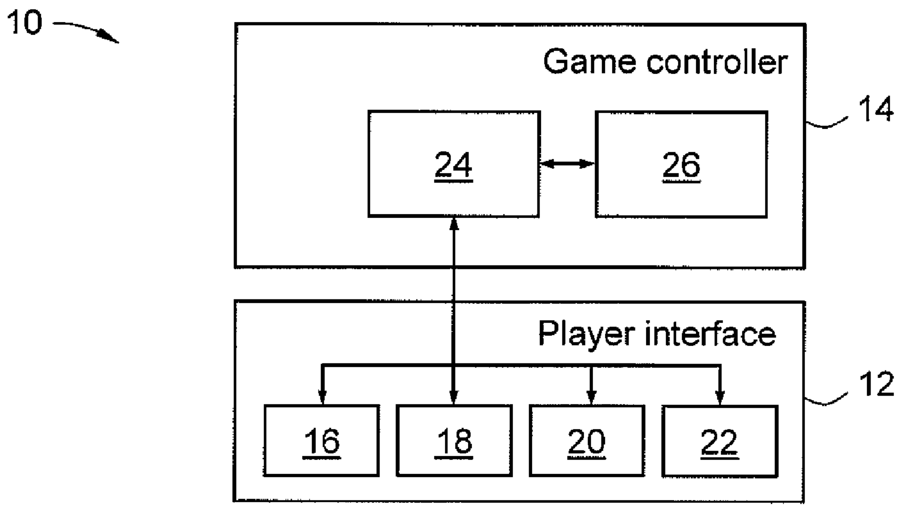
FIG. 1 is a block diagram of the core components of a gaming system.

Referring to the drawings, there is shown a gaming system having a game controller arranged to implement a game and, separately, remote (viz. from the game controller) compositing client, as described in greater detail below. In the embodiment, the compositing client takes the form of a field programmable gate array (FPGA), however, the compositing client may comprise, for example, a processor, a personal computer, a set top box, or a mobile telecommunications device such as a telephone or PDA.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a “thick client” architecture may be used wherein part of the game is executed on a player operable gaming machine and part of the game is executed remotely, such as by a gaming server; or a “thin client” architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, “thick client” mode or “thin client” mode depending on the game being played, operating conditions, and so on. Other variations will be apparent to persons skilled in the art.

Irrespective of the form, the gaming system has several core components. At the broadest level, the core components are a player interface 12 and a game controller 14 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 16 to enable a player to input credits and receive payouts, one or more displays 18, a game play mechanism 20 including one or more input devices that enable a player to input game play instructions (e.g. to place a wager), and one or more speakers 22.

The game controller 14 is in data communication with the player interface and typically includes a processor 24 that processes the game play instructions in accordance with game play rules and outputs game play outcomes to the display. Typically, the game play rules are stored as program code in a memory 26 but can also be hardwired. Herein the term “processor” is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor.

Figure 2:
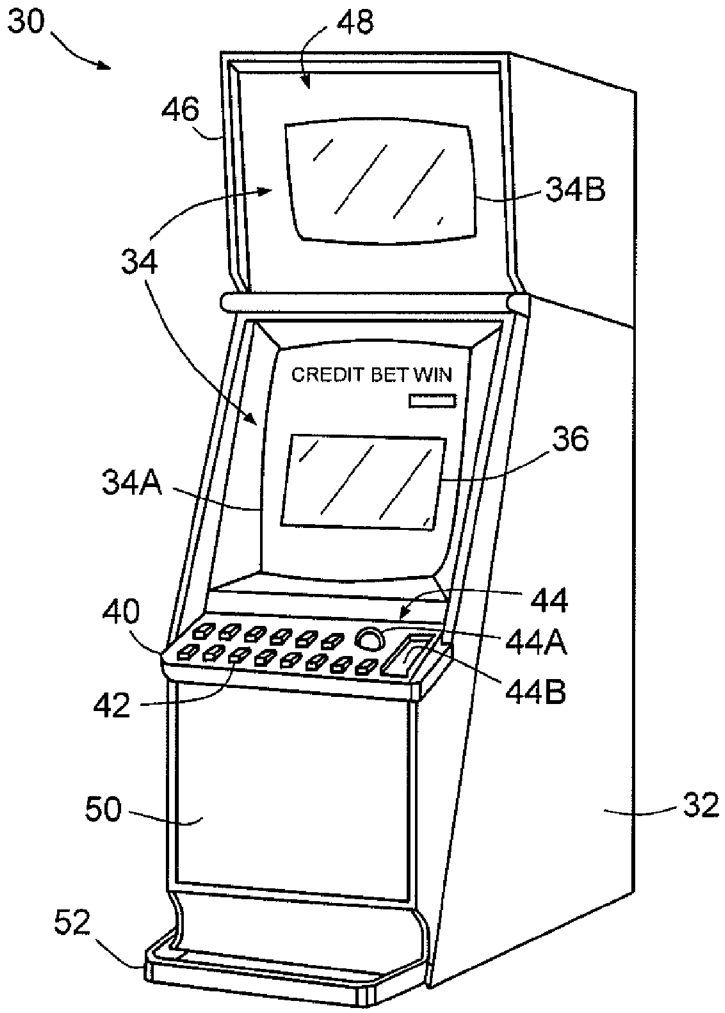
FIG. 2 is a perspective view of a stand alone gaming machine.

A gaming system in the form of a stand alone gaming machine 30 is illustrated in FIG. 2. The gaming machine 30 includes a console 32 having a display 34 on which are displayed representations of a game 36 that can be played by a player. A mid-trim 40 of the gaming machine 30 houses a bank of buttons 42 for enabling a player to interact with the gaming machine, in particular during game play. The mid-trim 40 also houses a credit input mechanism 44 which in this example includes a coin input chute 44A and a bill collector 44B. Other credit input mechanisms may also be employed, for example, a card reader for reading a smart card, debit card or credit card. Other gaming machines may be configured for ticket in such that they have a ticket reader for reading tickets having a value and crediting the player based on the face value of the ticket. A player marketing module (not shown) having a reading device may also be provided for the purpose of reading a player tracking device, for example as part of a loyalty program. (Player marketing modules are also know by other names, for example, they are often referred to as a player tracking module (PTM).) The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 46 may carry artwork 48, including for example pay tables and details of bonus awards and other information or images relating to the game. Further artwork and/or information may be provided on a front panel 50 of the console 32. A coin tray 52 is mounted beneath the front panel 50 for dispensing cash payouts from the gaming machine 30.

The display 34 shown in FIG. 2 includes a video display unit 34A, particularly a cathode ray tube screen device. Alternatively, video display unit 34A may be a liquid crystal display, plasma screen, any other suitable video display unit, or the visible portion of an electromechanical device. The top box 46 may also include a display, for example a video display unit 34B, which may be of the same type as video display unit 34A, or of a different type.

Figure 3:
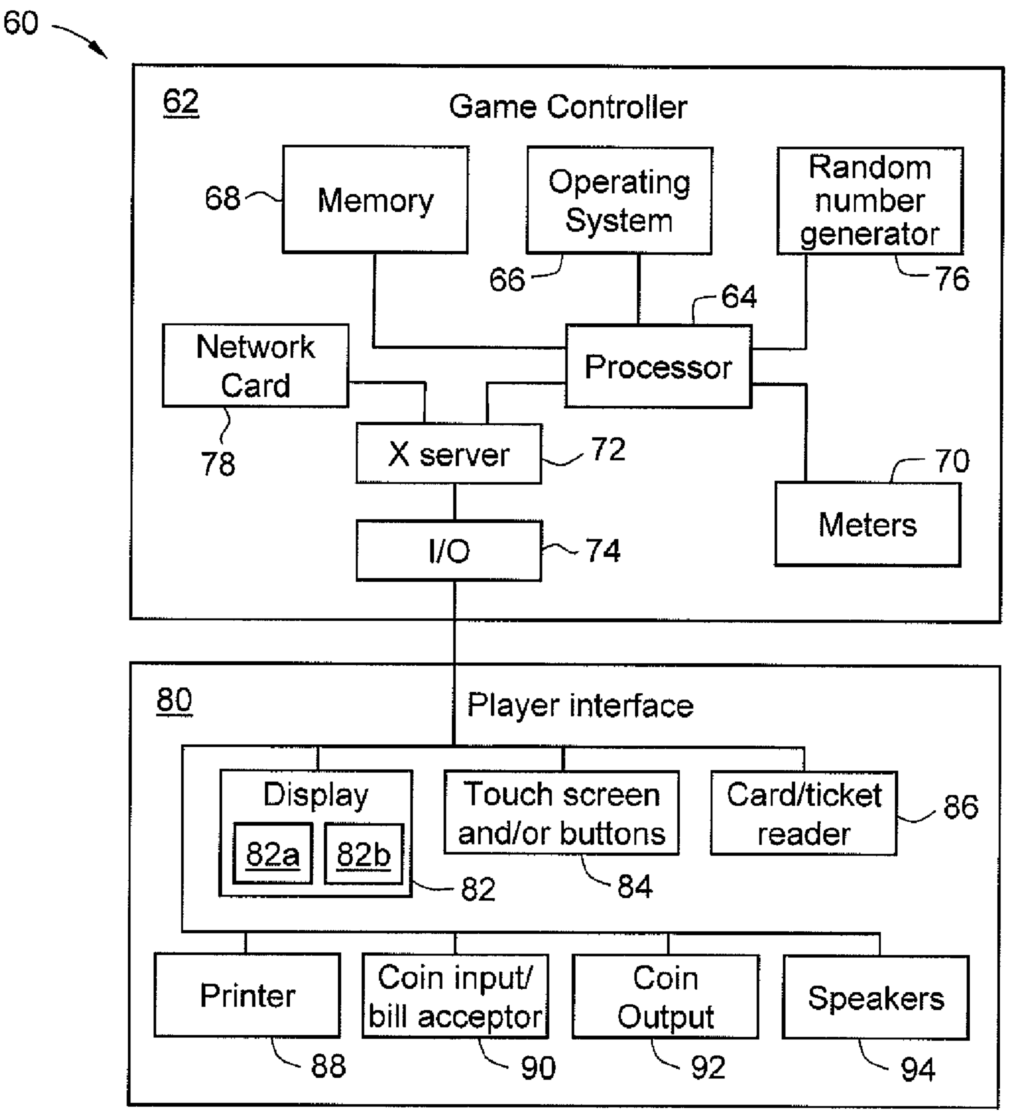
FIG. 3 is a block diagram of the functional components of a gaming machine.

FIG. 3 shows a block diagram of operative components of a typical gaming machine which may be the same as or different to the gaming machine of FIG. 2.

The gaming machine 60 includes a game controller 62 having a processor 64 mounted on a circuit board. Gaming machine 60 includes instructions and data to control operation of the processor 64, and an operating system 66. The instructions and data to control operation of the processor 64 are stored in a memory 68, which is in data communication with the processor 64. Typically, the gaming machine 60 will include both volatile and non-volatile memory and more than one of each type of memory, with such memories being collectively represented by the memory 68.

The gaming machine has hardware meters 70 for purposes including ensuring regulatory compliance and monitoring player credit, an input/output (I/O) interface 74 for communicating with peripheral devices of the gaming machine 60. The input/output interface 74 and/or the peripheral devices may be intelligent devices with their own memory for storing associated instructions and data for use with the input/output interface or the peripheral devices. A random number generator module 76 generates random numbers for use by processor 64. Persons skilled in the art will appreciate that the reference to random numbers includes pseudo-random numbers.

In the example shown in FIG. 3, a player interface 80 includes peripheral devices that communicate with the game controller 62 including one or more video displays 82, a touch screen and/or buttons 84 (which provide a game play mechanism), a card and/or ticket reader 86, a printer 88, a bill acceptor and/or coin input mechanism 90, a coin output mechanism 92 and speakers 94. Additional hardware may be included as part of the gaming machine 60, or hardware may be omitted as required for the specific implementation. For example, while buttons or touch screens are typically used as input devices in gaming machines to allow a player to place a wager and initiate a play of a game any input device that enables the player to input game play instructions may be used. For example, in some gaming machines a mechanical handle is used to initiate a play of the game.

In addition, the gaming machine 60 may include a communications interface, for example a network card 78. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
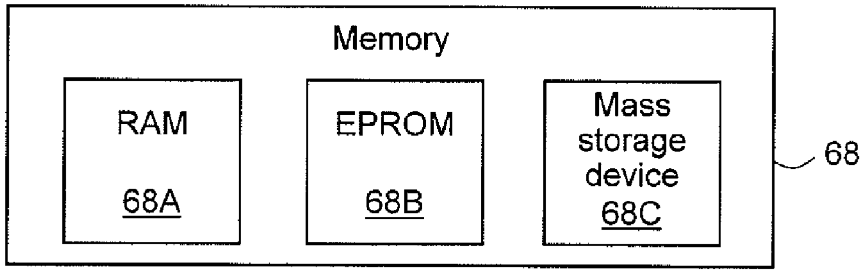
FIG. 4 is a schematic diagram of the functional components of a memory.

FIG. 4 shows a block diagram of the main components of an exemplary memory 68. The memory 68 includes RAM 68A, EPROM 68B and a mass storage device 68C. The RAM 68A typically temporarily holds program files for execution by the processor 102 and related data. The EPROM 68B may be a boot ROM device and/or may contain some system or game related code. The mass storage device 68C is typically used to store game programs, the integrity of which may be verified and/or authenticated by the processor 102 using protected code from the EPROM 68B or elsewhere.

It is also possible for the operative components of the gaming machine 60 to be distributed, for example input/output devices 82, 84, 86, 88, 90, 92, 94 to be provided remotely from the game controller 62.

Figure 5:
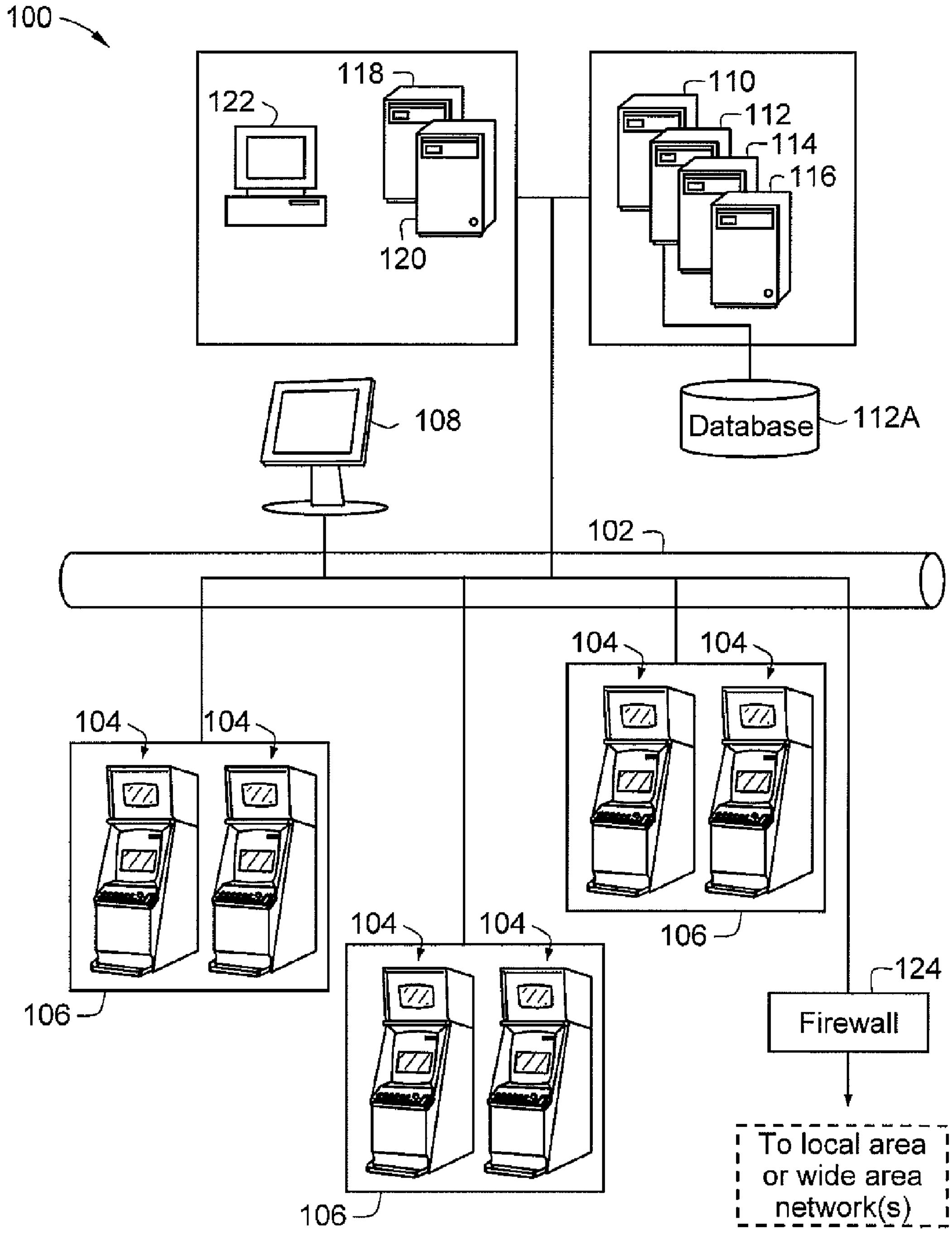
FIG. 5 is a schematic diagram of a network gaming system.

FIG. 5 shows a gaming system 100 in accordance with an alternative embodiment. The gaming system 100 includes a network 102, which for example may be an Ethernet network. Gaming machines 104, shown arranged in three banks 106 of two gaming machines 104 in FIG. 5, are connected to the network 102. The gaming machines 104 provide a player operable interface and may be the same as the gaming machines 30, 60 shown in FIGS. 2 and 3, or may have simplified functionality depending on the requirements for implementing game play. While banks 106 of two gaming machines are illustrated in FIG. 5, banks of one, three or more gaming machines are also envisaged.

One or more displays 108 may also be connected to the network 102. For example, the displays 108 may be associated with one or more banks 106 of gaming machines. The displays 108 may be used to display representations associated with game play on the gaming machines 104, and/or used to display other representations, for example promotional or informational material.

In a thick client embodiment, game server 110 implements part of the game played by a player using a gaming machine 104 and the gaming machine 104 implements part of the game. With this embodiment, as both the game server and the gaming device implement part of the game, they collectively provide or constitute a game controller. A database management server 112 may manage storage of game programs and associated data for downloading or access by the gaming machines 104 in a database 112A. Typically, if the gaming system enables players to participate in a Jackpot game, a Jackpot server 114 will be provided to perform accounting functions for the Jackpot game. A loyalty program server 116 may also be provided.

In a thin client embodiment, game server 110 implements most or all of the game played by a player using a gaming machine 104 and the gaming machine 104 essentially provides only the player interface. With this embodiment, the game server 110 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 102, including for example a gaming floor management server 118, and a licensing server 120 to monitor the use of licenses relating to particular games. An administrator terminal 122 is provided to allow an administrator to run the network 102 and the devices connected to the network.

The gaming system 100 may communicate with other gaming systems, other local networks, for example a corporate network, and/or a wide area network such as the Internet, for example through a firewall 124.

Persons skilled in the art will appreciate that in accordance with known techniques, functionality at the server side of the network may be distributed over a plurality of different computers. For example, elements may be run as a single "engine" on one server or a separate server may be provided. For example, the game server 110 could run a random generator engine. Alternatively, a separate random number generator server could be provided. Further, persons skilled in the art will appreciate that a plurality of game servers could be provided to run different games or a single game server may run a plurality of different games as required by the terminals.

Figure 6A:
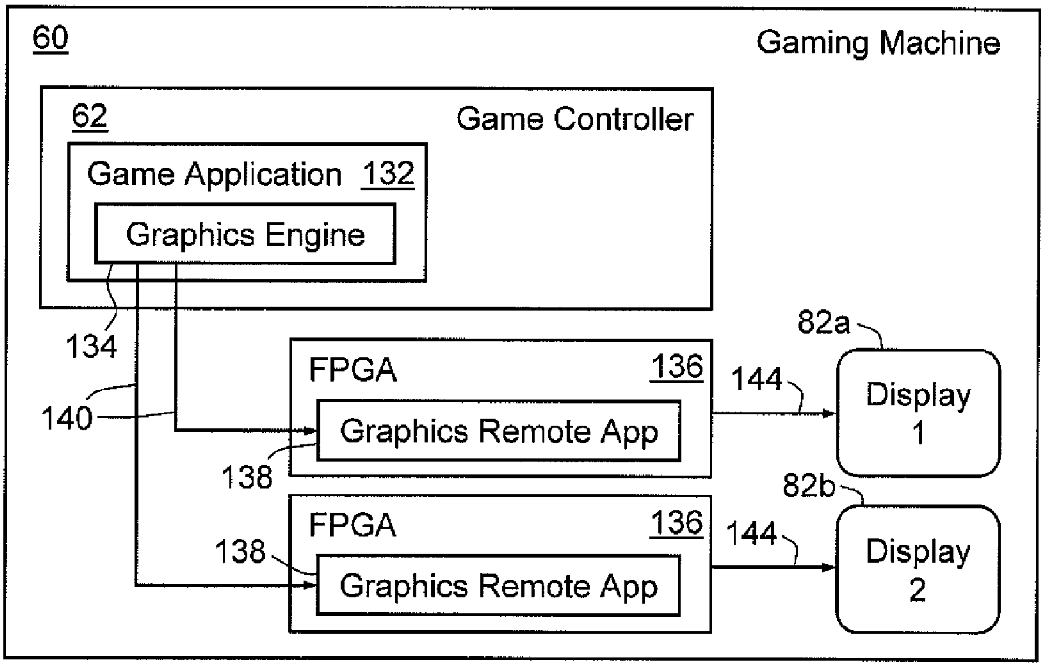
FIG. 6A is a further block diagram of a gaming system.

FIG. 6A is a further schematic view of gaming machine 60 including various modules (such as game controller 62); some of these modules are implemented based on program code and data stored in memory 68. Persons skilled in the art will appreciate that various of the modules could be implemented in some other way, for example by a dedicated circuit.

Referring to FIG. 6A, as described above gaming machine 60 includes game controller 62. Game controller 62 includes a game application 132 that includes a graphics or game engine 134, such as a Mercury brand graphics engine. (It will be appreciated by those in the art that graphics engine 134 may alternatively be provided within game controller 62 by a module that is separate from, rather provided in, game application 132.)

Gaming machine 60 includes a plurality of FPGAs 136 mounted on a circuit board (or on respective circuit boards), separate or remote from game controller 62. Each FPGA 136 includes a respective graphics remote application 138, and acts as a remote, programmable compositing client for graphical output that is to be displayed to a corresponding video display 82*a*, 82*b*. In the depicted embodiments, gaming machine 60 includes two FPGAs 136 acting as compositing clients for respective video display 82*a*, 82*b*, but it will be appreciated that in other embodiments only a single FPGA and video display may be provided, or plural video displays connected to a single FPGA (depending on processing power and the number of video outputs of the FPGA), or more than two FPGAs with a correspondingly greater number of video displays.

Graphics engine 134 of game controller 62 manages (including setting up) renderable graphics assets for use in graphical output ultimately to be output to video displays 82*a*, 82*b*. These source graphics assets include, for example, sprites and text. Graphics engine 134 communicates with FPGA 136 via a USB communications link 140, which may alternatively be—for example—a serial or ethernet link. Graphics engine 134 transmits the graphics assets on demand to the respective FPGA 136 via a communications link 140. Graphics engine 134 also transmits control data for controlling the graphical output to respective FPGA 136, via communications link 140; in this manner, graphics engine 134 controls various visual aspects (including positioning, rotation, scaling and fading) of the graphical output. Each FPGA 136 renders the graphical output and transmits the rendered graphical output via a DVI, D-sub video link (or other suitable communication link) 144 to the respective video display 82*a*, 82*b*.

Each FPGA 136 has memory, which is handled much as graphics engine 134 handles its texture cache. If a graphics asset is visible, FPGA 136 loads it; when a graphics asset is out of scope, the graphics asset is freed so that the memory of the respective FPGA 136 has a small footprint.

It should be noted that one or more of video displays 82*a*, 82*b* may be a small or secondary screen interface (such as for displaying a dynamic pay table, a dynamic button deck or a progressive display). Indeed, the same approach may be employed to display the output of a player tracking module (PTM), for inspection by an administrator, either associated with gaming machine 60 or provided in administrator terminal 122.

This configuration is expected to improve speed in some applications, and with minimal data storage requirements, in rendering rich scenes and live text. As rendering is off-loaded to FPGAs 136, game controller 62 need only handle layout and update handling. Data transfer over communications link 140 (between graphics engine 134 and FPGAs 136) is minimized; it is envisaged that it may in many applications be as low as an average of 1 kB per frame of graphical output. Furthermore, this approach allows game controller 62 to take advantage of any blitters on FPGAs 136. It may be particularly attractive for use in controlling the graphical output displayed on secondary or small video displays, as the described approach allows the elimination of a separate game circuit board for driving such secondary displays.

Figure 6B:
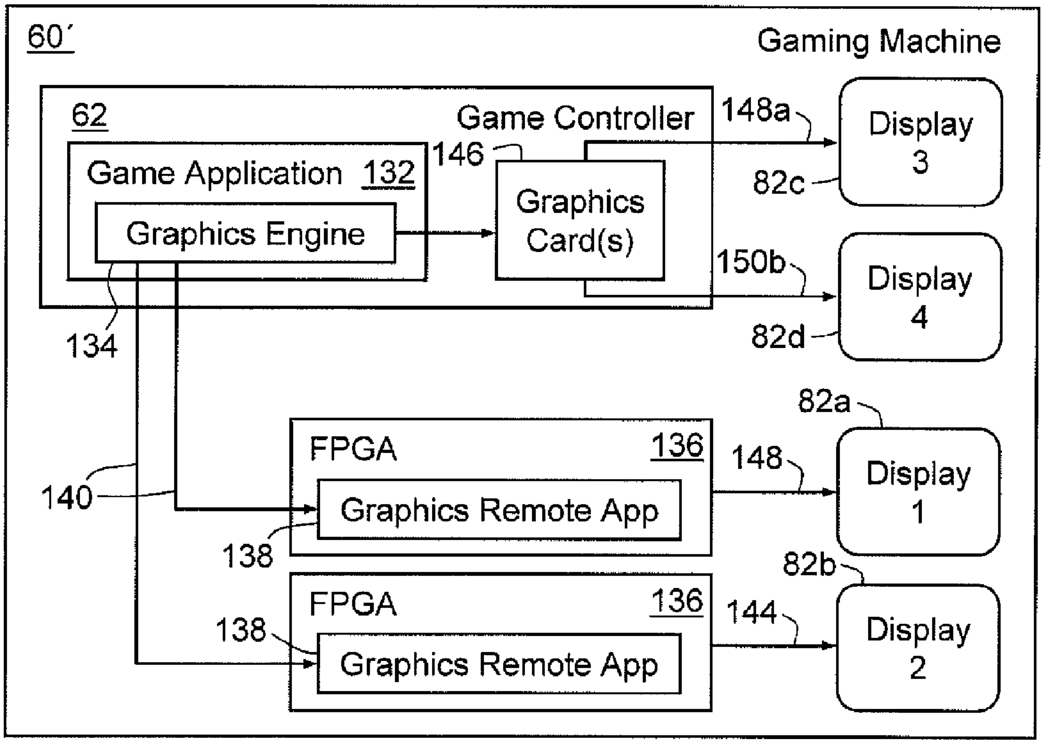
FIG. 6B is a block diagram of a variation of the gaming system of FIG. 6A.

FIG. 6B is a view of a variation 60' of gaming machine 60 according to this embodiment. Gaming machine 60' is, in many respects, identical with gaming machine 60 of FIG. 6A, and like reference numerals have been used to identify like features. However, gaming machine 60' employs FPGAs 136 as compositing clients for secondary video displays 82*a*, 82*b*. Gaming machine 60' has two principal video displays 82*c*, 82*d*, but principal video displays 82*c*, 82*d* are driven by graphics engine 134 via a standard video card 146 provided in game controller 62 and respective DVI or D-sub video links 148*a*, 148*b* (or other suitable communication links) connected to standard video outs of video card 146.

Thus, gaming machine 60' employs a combination of video displays, with graphical output rendered in a conventional manner to principal video displays 82*c*, 82*d* by graphics engine 134 and graphical output rendered to secondary video displays 82*a*, 82*b* by FPGAs 136.

Figure 7:
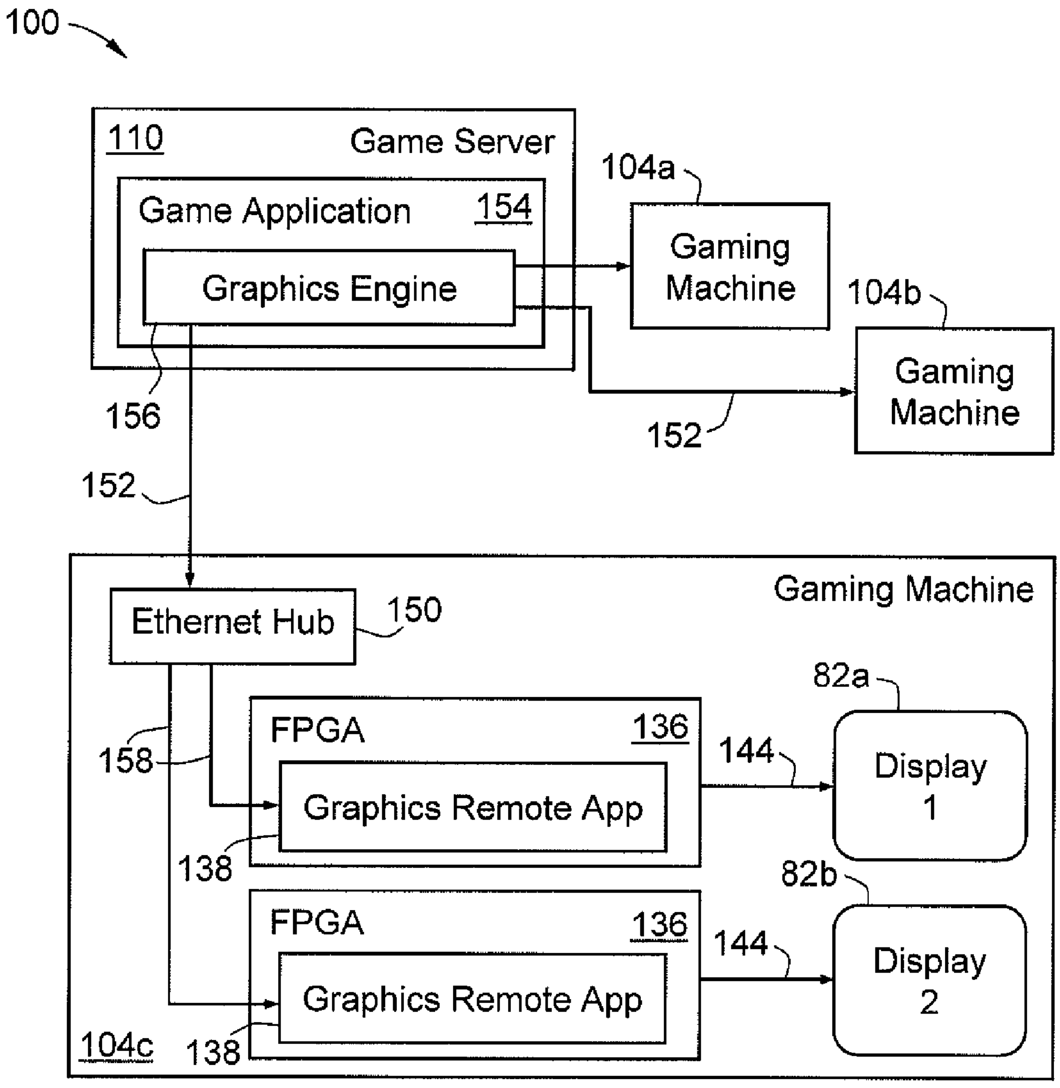
FIG. 7 is a further block diagram of a network gaming system.

FIG. 7 is a further, simplified schematic view of gaming system 100, depicting game server 110 and three representative gaming machines 104*a,b,c*. Gaming machines 104*a,b,c* are, in this embodiment, identical, but exemplary gaming machine 104*c* is shown in greater detail. Gaming machine 104*c* includes some components that are comparable to components of gaming machine 60 of FIG. 6A, so like reference numerals have been used to indicate like features. For example, gaming machine 104*c* has a plurality of FPGAs 136 mounted on a circuit board (or on respective circuit boards). Each FPGA 136 includes a respective graphics remote application 138, and acts as a remote, programmable compositing client for graphical output that is to be displayed to a corresponding video display 82*a*, 82*b*. In the depicted embodiments, gaming machine 104*c* includes two FPGAs 136 acting as compositing clients for respective video display 82*a*, 82*b*, but it will be appreciated that in other embodiments only a single FPGA and video display may be provided, or a single FPGA with plural video displays, or more than two FPGAs with a greater number of video displays.

However, gaming machine 104*c* also includes a communications hub 150, such as a USB or Ethernet hub, according to the communications protocol of communications between game server 110 and gaming machine 104*c*, and game server 110 communicates with gaming machine 104*c* (and correspondingly with gaming machines 104*a,b*) via a communications link 152 which may again comprise a USB, serial or Ethernet link. Gaming machine 104*c* further includes communications links 158 between hub 150 and respective FPGAs 136. Communications links 158 may also comprise USB, serial or Ethernet links.

Game server 110 includes a game application 154 that includes a graphics or game engine 156; these are respectively comparable to game application 132 and graphics engine 134 of gaming machine 60 of FIG. 6A, and thus graphics engine 156 manages renderable graphics assets for use in graphical output ultimately to be output to video displays 82*a*, 82*b* of gaming machine 104*c* (and indeed the corresponding video displays of gaming machines 104*a,b*).

FPGAs 136 of gaming machine 104*c* (and of corresponding FPGAs of gaming machines 104*a,b*) thus receive renderable graphic assets and graphical output control data from graphics engine 156 via communications links 152 and 158, graphics engine 150 transmitting the graphics assets on demand to the respective FPGA 136.

Each FPGA 136 renders the graphical output and transits the rendered graphical output via a DVI or D-sub video link 144 to the respective video display 82*a*, 82*b*. Graphics engine 150 controls various visual aspects (including positioning, rotation, scaling and fading) of the graphical output displayed on video display 82*a*,82*b* of gaming machine 104*c* (and similarly on the video displays of gaming machines 104*a,b*).

It will be appreciated that, in a variation of gaming system 100 of FIG. 7, one or more of gaming machines 104*a,b,c* may include further video displays comparable to video displays 82*c*, 82*d* of gaming machine 60' of FIG. 6B, driven by respective graphics cards located either in such gaming machines or in game server 110. Also, in other variations gaming machines 104*a,b,c* are different, such that gaming system 100 includes a mixture of gaming machines including one or more gaming machines comparable to gaming machine 60 of FIG. 6A and one or more gaming machine comparable to gaming machine 60' of FIG. 6B.

Figure 8:
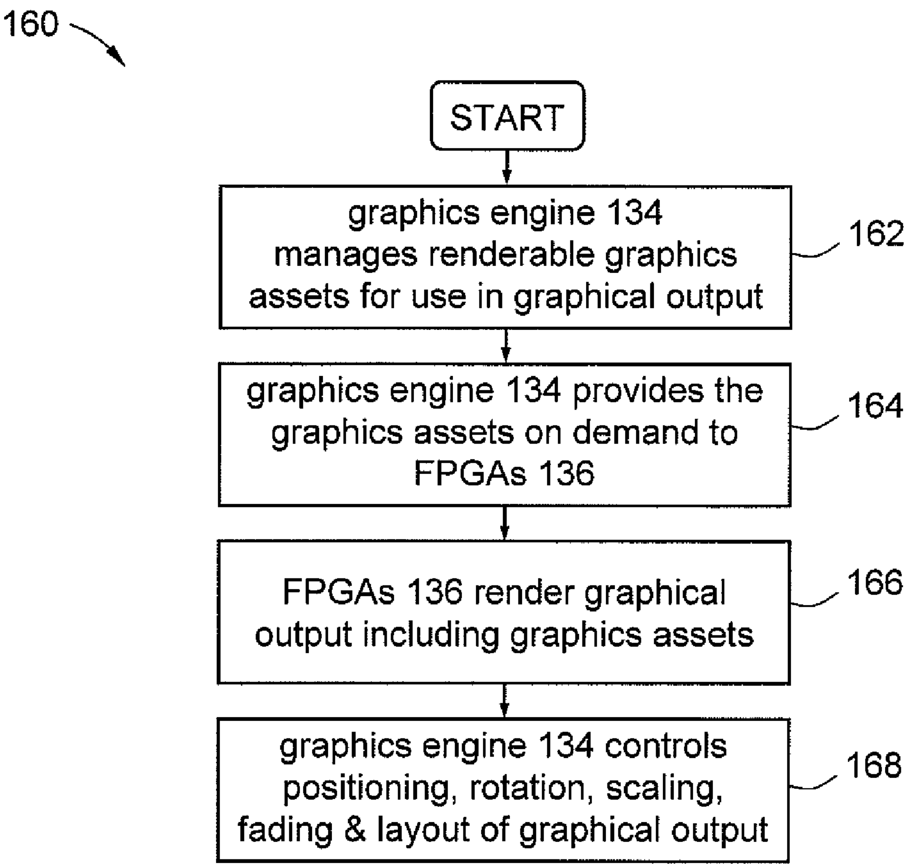
FIG. 8 is a flow chart of an embodiment.

The basic method of the above embodiments of the invention is summarised in flow diagram 160 of FIG. 8. Flow diagram 160 presents the steps of the method sequentially, but it will be appreciated that multiple instances of each step will occur during a game, and in most cases essentially concurrently. Referring to FIG. 8, at step 162, graphics engine 134 manages renderable graphics assets for use in graphical output. At step 164, graphics engine 134 provides the graphics assets on demand to FPGAs 136. At step 166, FPGAs 136 render graphical output including graphics assets to video displays 82*a*, 82*b*.

At step 168, graphics engine 134 controls positioning, rotation, scaling and fading (and optionally the layout) of the graphical output.

Further aspects of the method will be apparent from the above description of the system. It will be appreciated that at least part of the method will be implemented electronically, for example digitally by a processor. Persons skilled in the art will also appreciate that the method could be embodied in program code. The program code could be supplied in a number of ways, for example on a tangible computer readable storage medium, such as a disc or a memory (for example, that could replace part of memory 68) or as a data signal (for example, by transmitting it from a server). Persons skilled in the art, will appreciate that program code provides a series of instructions executable by the processor.

It will also be understood by persons skilled in the art of the invention that many modifications may be made without departing from the scope of the invention; in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for use with a gaming machine having a programmable compositing client and a plurality of electronic displays for displaying graphical output, a graphics engine, and at least one graphics card, the method comprising:

driving a first of said plurality of electronic displays with said programmable compositing client;

driving a second of said plurality of electronic displays with said at least one graphics card independently of the first of said electronic displays and said programmable compositing client;

managing renderable graphics assets for use in the graphical output of said first of said plurality of electronic displays with said graphics engine;

providing said renderable graphics assets on demand to said programmable compositing client with said graphics engine so as to drive said first of said plurality of electronic displays;

rendering one or more of said renderable graphics assets with said programmable compositing client;

controlling one or more visual aspects of the rendered graphics assets of the graphical output of said first of said electronic displays with the graphics engine via said programmable compositing client; and controlling the graphical output of said second electronic display with the graphics engine via said at least one graphics card.

2. A method as claimed in claim 1, wherein said controlling the graphical output of said second electronic display includes controlling one or more of positioning, rotation, scaling, fading and layout of said graphical output with said graphics engine.

3. A method as claimed in claim 1, comprising providing said graphics engine in said gaming machine.

4. A method as claimed in claim 1, comprising providing said graphics engine in a game controller of said gaming machine.

5. A method as claimed in claim 1, comprising providing said graphics engine in a game server remote from said gaming machine.

6. A method as claimed in claim 1, wherein said programmable compositing client comprises a field-programmable gate array.

7. A method as claimed in claim 1, wherein said programmable compositing client comprises a processor.

8. A method as claimed in claim 1, wherein said compositing client comprises a personal computer.

9. A method as claimed in claim 1, wherein said programmable compositing client comprises a set top box.

10. A method as claimed in claim 1, wherein said programmable compositing client comprises a mobile telephone or other mobile telecommunications device.

11. A method as claimed in claim 1, wherein said controlling one or more visual aspects of the rendered graphics assets of the graphical output comprises controlling one or more of positioning, rotation, scaling, fading and layout of said graphical output with said graphics engine.

12. A method of providing graphical output for an electronic device having a programmable compositing client and a plurality of electronic displays for displaying the graphical output, a graphics engine, and at least one graphics card, the method comprising:

driving a first of said plurality of electronic displays with said programmable compositing client;

driving a second of said plurality of electronic displays with said at least one graphics card independently of the first of said electronic displays and said programmable compositing client;

managing renderable graphics assets for use in the graphical output of said first of said plurality of electronic displays with said graphics engine;

providing said renderable graphics on demand to said programmable compositing client with said graphics engine so as to drive said first of said plurality of electronic displays;

rendering one or more of said renderable graphics assets with said programmable compositing client;

controlling one or more visual aspects of the rendered graphics assets of the graphical output of said first of said electronic displays with the graphics engine via said programmable compositing client; and controlling the graphical output of said second electronic display with the graphics engine via said at least one graphics card.

13. A method as claimed in claim 12, wherein said controlling the graphical output of said second electronic display includes controlling one or more of positioning, rotation, scaling, fading and layout of said graphical output with said graphics engine.

14. A method of for use with a gaming machine having a programmable compositing client and a plurality of electronic displays for displaying graphical output, a graphics engine, and at least one graphics card, the method comprising:

managing, with said graphics engine, renderable graphics assets for use in said graphical output to be displayed on a first of said electronic displays;

providing, with said graphics engine, said renderable graphics assets on demand to said programmable compositing client;

driving a first of said electronic displays with said programmable compositing client;

driving a second of said electronic displays with said graphics card independently of the first of said electronic displays and said programmable compositing client;

rendering one or more of said renderable graphics assets with said programmable compositing client;

controlling one or more visual aspects of the rendered graphics assets of the graphical output of said first of said electronic displays with the graphics engine via said programmable compositing client; and controlling the graphical output of said second of said electronic displays with the graphics engine via said at least one graphics card.

15. A method as claimed in claim 14, wherein said programmable compositing client comprises a field-programmable gate array (FPGA).

16. A game controller for a gaming system having a plurality of electronic displays for displaying graphical output, the game controller configured to:

manage renderable graphics assets for use in the graphical output of a first of said plurality of electronic displays with a graphics engine;

provide said renderable graphics assets on demand to a programmable compositing client with said graphics engine, for use by said programmable compositing client;

drive a first of said electronic displays with said programmable compositing client;

drive a second of said electronic displays with a graphics card independently of the first of said electronic displays and said programmable compositing client;

control one or more visual aspects of the rendered graphics assets of the graphical output of said first of said electronic displays with the graphics engine via said programmable compositing client; and control the graphical output of said second of said electronic displays with the graphics engine via said graphics card.

17. A game controller as claimed in claim 16, and being configured further to control one or more of positioning, rotation, scaling, fading and layout of said graphical output of said first of said electronic displays with said graphics engine.

18. A game controller as claimed in claim 16, wherein the game controller is provided in a gaming machine of said gaming system.

19. A game controller as claimed in claim 16, wherein said graphics engine is provided in said game controller.

20. A game controller as claimed in claim 16, wherein said graphics engine is provided in a game server of said gaming system remote from said gaming machine.

21. A game controller as claimed in claim 16, wherein said programmable compositing client comprises a field-programmable gate array.

22. A controller for an electronic device having a plurality of electronic displays for displaying graphical output, the controller configured to:

manage renderable graphics assets for use in graphical output of a first of said plurality of electronic displays with a graphics engine;

provide said renderable graphics assets on demand to a programmable compositing client with said graphics engine, for use by said programmable compositing client;

drive a first of said electronic displays with said programmable compositing client;

drive a second of said electronic displays with a graphics card independently of the first of said electronic displays and said programmable compositing client;

control one or more visual aspects of the rendered graphics assets of the graphical output of said first of said electronic displays with said graphics engine via said programmable compositing client; and control the graphical output of said second of said electronic displays with the graphics engine via said graphics card.

23. A controller as claimed in claim 22, configured to control one or more of positioning, rotation, scaling, fading and layout of said graphical output with said graphics engine.

24. A gaming system having a programmable compositing client, a graphics engine, and a graphics card, the system comprising:

a player interface comprising a plurality of electronic displays for displaying game outcomes to a player; and a game controller configured to:

manage renderable graphics assets for use in graphical output of a first of said plurality of electronic displays with said graphics engine;

provide said renderable graphics assets on demand to said programmable compositing client provided with said graphics engine, for use by said programmable compositing client in rendering said graphical output;

drive a first of said electronic displays with said programmable compositing client;

drive a second of said electronic displays with said graphics card independently of the first of said electronic displays and said programmable compositing client;

control one or more visual aspects of the rendered graphics assets of the graphical output of said first of said electronic displays with the graphics engine via said programmable compositing client; and control the graphical output of said second of said electronic displays with the graphics engine via said graphics card.

25. A gaming system as claimed in claim 24, wherein said game controller is configured to control one or more of positioning, rotation, scaling, fading and layout of said graphical output with said graphics engine.

26. A gaming system comprising:

a plurality of electronic displays for displaying graphical output;

a programmable compositing client; and a graphics engine configured to manage renderable graphics assets for use in said graphical output of a first of said plurality of electronic displays and to provide said renderable graphics assets on demand to said programmable compositing client with said graphics engine, and to drive a second electronic display of said gaming machine with a graphics card independently of the first electronic display and said programmable compositing client, said compositing client rendering one or more of said renderable graphics assets with said programmable compositing client, said graphics engine controlling one or more visual aspects of the rendered graphics assets of the graphical output of said first electronic display with the graphics engine via said programmable compositing client, and controlling the graphical output of said second electronic display with the graphics engine via said graphics card.

27. A gaming system as claimed in claim 26, wherein said graphics engine controls one or more of positioning, rotation, scaling, fading and layout of said graphical output with said graphics engine.

28. A gaming system as claimed in claim 26, wherein said programmable compositing client comprises a field-programmable gate array.

29. A gaming system as claimed in claim 26, in the form of a gaming machine.

* * * * *